United States Patent [19]

Naito

[11] 4,373,684
[45] Feb. 15, 1983

[54] BELT RETRACTOR

[75] Inventor: Katsumi Naito, Fujisawa, Japan

[73] Assignees: Nissan Motor Co., Ltd.; NSK-Warnar K.K., both of Japan

[21] Appl. No.: 190,281

[22] Filed: Sep. 24, 1980

[30] Foreign Application Priority Data

Sep. 27, 1979 [JP] Japan .................... 54-132526[U]

[51] Int. Cl.³ .................... A62B 35/00; B65H 75/48
[52] U.S. Cl. .................... 242/107.6; 280/807; 297/475
[58] Field of Search ............ 242/107.6, 107.7, 107.12, 242/107.4 R, 107.4 E; 280/801, 803, 806–808; 297/475–478; 180/268, 269, 270

[56] References Cited

U.S. PATENT DOCUMENTS

| 3,682,412 | 8/1972 | Kuszynski . | |
|---|---|---|---|
| 3,908,928 | 9/1975 | Okada . | |
| 4,172,568 | 10/1979 | Yamanashi et al. | 242/107.6 |
| 4,199,172 | 4/1980 | Fukunaga et al. | 242/107.6 X |
| 4,228,971 | 10/1980 | Arima et al. | 242/107.6 |
| 4,241,938 | 12/1980 | Patel et al. | 242/107.7 |
| 4,261,531 | 4/1981 | Naitoh | 242/107.6 |

FOREIGN PATENT DOCUMENTS

| 2254003 | 5/1973 | Fed. Rep. of Germany . |
| 2705653 | 9/1977 | Fed. Rep. of Germany . |
| 2270901 | 12/1975 | France . |
| 2277422 | 1/1976 | France . |
| 2306714 | 5/1976 | France . |
| 2397845 | 2/1979 | France . |
| 2446650 | 8/1980 | France . |
| 2039723 | 8/1980 | United Kingdom . |

*Primary Examiner*—John M. Jillions
*Attorney, Agent, or Firm*—Thompson, Birch, Gauthier & Samuels

[57] ABSTRACT

A belt retractor is disclosed which includes a rotary shaft having thereon a belt reel with a coil of seat belt wound therearound. The rotary shaft is rotatable in a first direction when the seat belt is pulled out and is spring-biased for rotation in a second direction to retract the seat belt around the belt reel. Lock means is provided for locking the rotary shaft so that the rotary shaft is prevented from rotating in the second direction but permitted to rotate through a predetermined angle in the first direction and to rotate back through the permitted angle in the second direction. Drive means is provided for bringing the lock means into driving connection with the rotary shaft when the seat belt is being worn around the user.

7 Claims, 6 Drawing Figures

BELT RETRACTOR

BACKGROUND OF THE INVENTION

1. Field of the Invention

This invention relates to a belt retractor for use with a seat belt to be worn around the user for optimum safety and, more particularly, to such a belt retractor adapted to automatically lock to prevent the seat belt from being retracted, but permit a predetermined length of seat belt extraction and retraction after the seal belt has been positioned around the user.

2. Description of the Prior Art

Various types of belt retractors have been proposed which can automatically lock when the seat belt is being worn. The lock prevents the seat belt from being pulled our further but permits the seat belt to retract so that a closer fit can be maintained around the user. One of the difficulties has been assuring that the seat belt was locked around the user with neither excessive tension nor excessive slack therein. The present invention provides means for locking the seat belt to prevent retraction of the seat belt but permit a predetermined length of extraction and retraction of the seat belt while the seat belt is being worn.

SUMMARY OF THE INVENTION

This invention provides a belt retractor including a reel shaft having thereon a belt reel with a coil of seat belt wound therearound. The reel shaft is secured to a frame structure for rotation in a first direction when the seat belt is pulled out, and is spring-biased for rotation in a second direction to retract the seat belt around the belt reel.

According to this invention, rotation of the reel shaft is locked by lock means movable into and out of driving connection with the reel shaft. The lock means prevents rotation of the reel shaft in the second direction but permits the reel shaft to rotate through a predetermined angle in the first direction and to rotate back by the permitted angle in the second direction. Preferably, the lock means comprises a main gear secured on the reel shaft, an idle gear for mesh engagement with the main gear, a stop gear held in mesh engagement with the idle gear, a pair of cam members secured to the idle and stop gears, respectively, and spring means for urging one of the idle and stop gears to hold the cam members in engagement in a position to prevent the idle gear from rotating in a first direction but permit the idle gear to rotate in a second direction opposite the first direction against the force of the spring means until the cam members come into engagement at another position where the idle gear cannot rotate in the second direction but can rotate in the first direction.

Drive means is provided for bringing the lock means into driving connection with the reel shaft when the seat belt is worn around the user. The drive means comprises link means spring-biased toward a first position where it takes the lock means out of driving connection with the reel shaft. The link means is movable with the rotation of the reel shaft in the second direction toward a second position where it brings the lock means into driving connection with the reel shaft. The drive means also comprises control means spring-biased toward a first position where it restricts the movement of the link means toward its second position. The control means is movable to a second position where it permits the link means to move to its second position and holds the link means in the second position. The control means is moved to its second position by actuator means which is in operation when the seat belt is worn around the user. The control means is spring-biased toward its first position.

BRIEF DESCRIPTION OF THE DRAWINGS

The details as well as other features and advantages of this invention are set forth below and are shown in the accompanying drawings, in which like parts are designated by like reference numerals while similar parts having identical functions are designated by the same reference numeral followed by the suffix prime, and wherein.

DESCRIPTION OF THE PREFERRED EMBODIMENT

Figure 1:
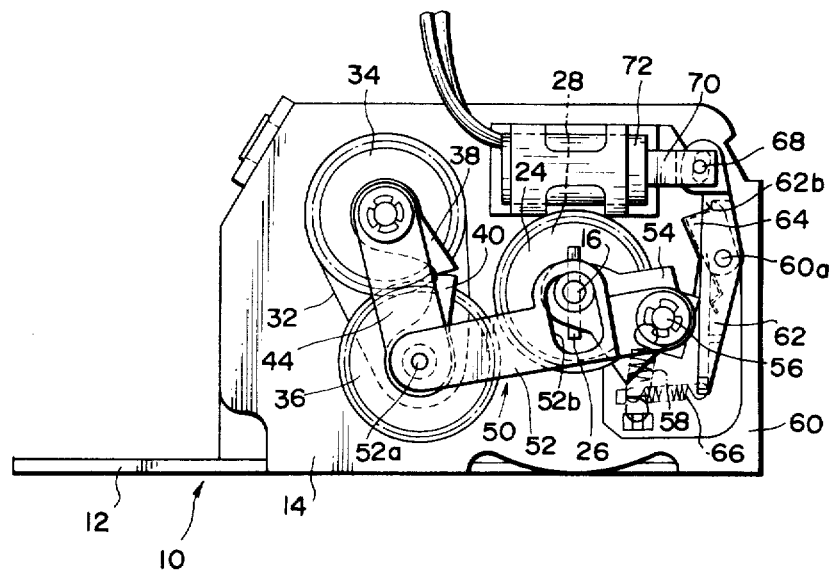
FIG. 1 is an elevational view showing a significant portion of the belt retractor constructed in accordance with the present invention.
Figure 5:
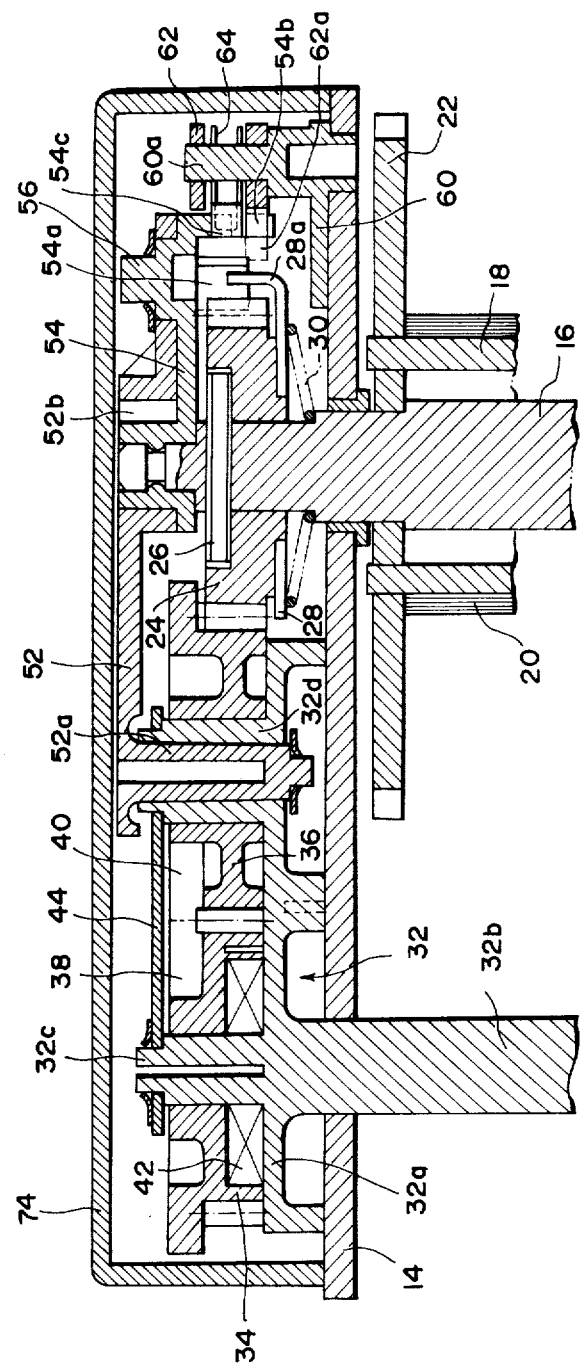
FIG. 5 is a sectional view taken along the line V—V of FIG. 4.

Referring now to FIGS. 1 and 5, which illustrate a significant portion of the belt retractor made in accordance with the present invention, the reference numeral 10 designates a frame structure having a bottom plate 12 and a pair of spaced-parallel side plates, only one of which is shown as 14 in FIG. 1. The side plates 14 rotatably support a reel shaft 16. The reel shaft 16 carries thereon a belt reel 18 around which a coil of seat belt 20 is wound and also a latch plate 22 which constitutes part of a conventional emergency lock mechanism for preventing rotation of the reel shaft 16 in the direction of the seat belt extraction when the vehicle speed changes at rates above a predetermined value or the seat belt 20 is pulled out at an excessive rate. Not forming a part of the present invention, the emergency lock mechanism will not be described herein. The seat belt 20 has at its free end a tongue (not shown) secured thereto for insertion into the buckle (not shown) of the associated seat belt when the seat belt is being worn around the user. The reel shaft 16 is spring biased by a belt retracting spring (not shown) to rotate in the direction of the seat belt being retracted; i.e., in a clockwise direction in FIG. 1.

The reel shaft 16 has its end portion extending outwardly from the side plate 14 and carries thereon a main gear 24 keyed thereto by a shear pin 26. A disc plate 28 is mounted on the rear surface of the main gear 24. A cone spring 30 is seated between the disc plate 28 and a shoulder portion formed in the reel shaft 16 to resiliently urge the disc plate 28 against the main gear 24 so that the disc plate can rotate with the main gear 24 as the reel shaft rotates. The disc plate 28 has a projection 28a extending forward therefrom as will be described in detail hereinbelow.

A shifter 32 is formed integrally with a base plate 32a placed on the front surface of the side plate 14, a pivot shaft 32b extending rearwardly from the base plate 32a through the side plate for rotatably supporting the base plate 32a, a gear shaft 32c extending forwardly from the base plate in alignment with the pivot shaft 32b, and a hollow gear shaft 32d extending forwardly from the base plate parallel to the gear shaft. The shifter 32 may be in the form of a moulded resin product.

The shifter 32 carries thereon a stop gear 34 rotatably fitted around the gear shaft 32c and also an idle gear 36 rotatably fitted around the hollow gear shaft 32d in mesh engagement with the stop gear 34. The stop gear 34 has a first cam member 38 extending radially therefrom, and the idle gear 36 has a second cam member 40 extending radially therefrom. The stop gear 34 is formed in its bottom surface with a recess which receives a return spring 42. The return spring 42 serves to urge the stop gear 34 to rotate in a clockwise direction in FIG. 1 so that the first cam member 38 is held in engagement with the second cam member 40 in a first position as shown in FIG. 1, thereby restricting counter-clockwise rotation of the idle gear 36, but permitting clockwise rotation of the idle gear until the first and second cam members 38 and 40 come into engagement with each other in a second position substantially symmetric about a line passing through the centers of the stop and idle gears 34 and 36. The angle through which the idle gear 36 is permitted to rotate may be determined by the choice of the ratio of tooth numbers between the stop and idle gears 34 and 36. In the second position, the idle gear 36 cannot rotate further in the clockwise direction. The stop and idle gears 34 and 36 are held in place by a clamping member 44.

When the shifter 32 swings to bring the idle gear 36 into mesh engagement with the main gear 24, rotation of the reel shaft 16 is locked. The lock prevents rotation of the reel shaft in the clockwise direction but permits the reel shaft to rotate the predetermined angle in the counter-clockwise direction and to rotate back by the permitted angle in the clockwise direction.

A toggle joint, generally designated as 50, is provided for bringing the idle gear 36 into and out of mesh engagement with the main gear 24. The toggle joint 50 includes a link lever 52 formed at one end with a pivot pin 52a rotatably fitted in the shifter hollow gear shaft 32d and at its intermediate section with an elongate hole 52b through which the reel shaft 16 extends to permit a predetermined angle of rotation of the link lever 52 around the hollow gear shaft 32d between the first position shown in FIG. 1 and a second position shown in FIG. 4.

The toggle joint 50 also includes a link arm 54 which has one end pivotally secured to the reel shaft 16 for rotation therearound and the other end pivoted at 56 to the other end of the link lever 52. The link arm 54 is formed with a groove 54a in its rear surface into which the disc plate projection 28a extends. The groove 54a forms an arc of a circular groove and has a predetermined length for permitting a predetermined angle of rotation of the projection 28a therein. The length of the groove 54a may be determined to provide optimum slack on the seat belt when the seat belt is locked. The link arm 54 also includes first and second projections 54b and 54c extending therefrom toward the side plate 14. A coil spring 58 is positioned between the pivot 56 and a suitable point on the side plate 14 to bias the toggle joint 50 toward the first position as shown in FIG. 1. In the second position of the toggle joint 50 (see FIG. 4), the idle gear 36 is brought and held in mesh engagement with the main gear 24.

On the side plate 14 there is fixedly secured a frame structure 60 having a shaft 60a on which a trigger member 62 is rotatably secured. The trigger member 62 has a hook portion 62a for engagement with the link arm first projection 54b and a stop 62b. The trigger member 62 is formed with a recess in which a hook plate 64 is placed for engagement with the link arm second projection 54c. The hook plate is rotatably mounted on the frame structure shaft 60a and is spring biased in a counter-clockwise direction toward the position shown in FIG. 1 where a tab portion 64a engages the trigger member stop 62b. A coil spring 66 is positioned between one end of the trigger member 62 and a suitable point on the frame structure 60 to urge the trigger member in a clockwise direction. The other end of the trigger member 62 is connected through a spring pin 68 to a plunger 70. The plunger 70 is urged to the left in FIG. 1 when the associated solenoid 72 is energized. The energization of the solenoid 72 is caused by insertion of the seat belt tongue into the associated buckle to actuate the buckle switch (not shown). A cover 74 is fitted on the side plate 14 to cover these components.

Figure 2:
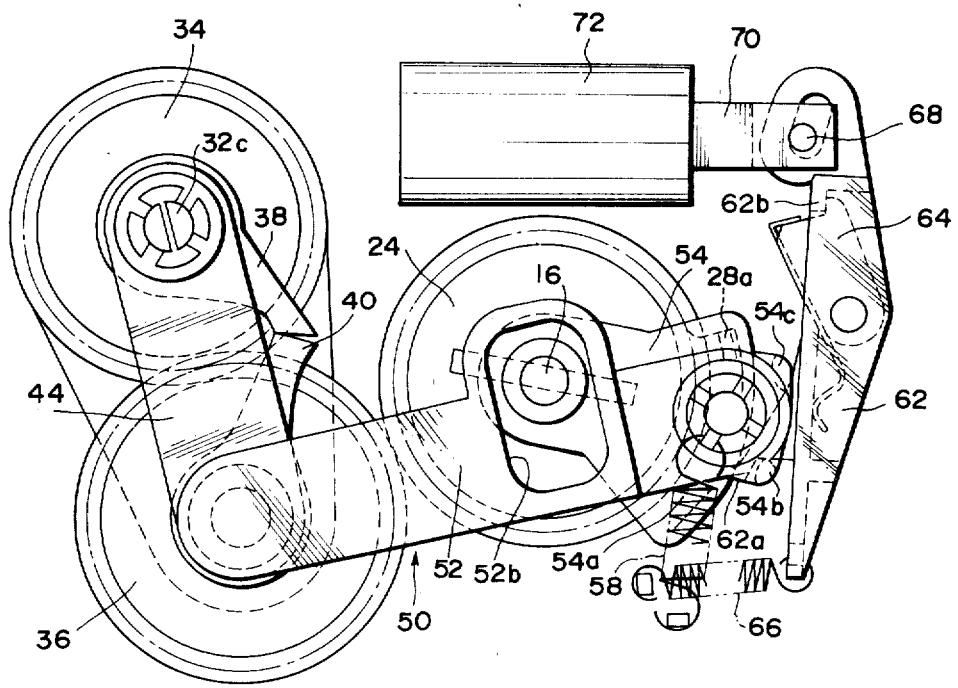
FIGS. 2 to 4 are elevational views used in explaining the operation of the belt retractor of FIG. 1.
Figure 3:
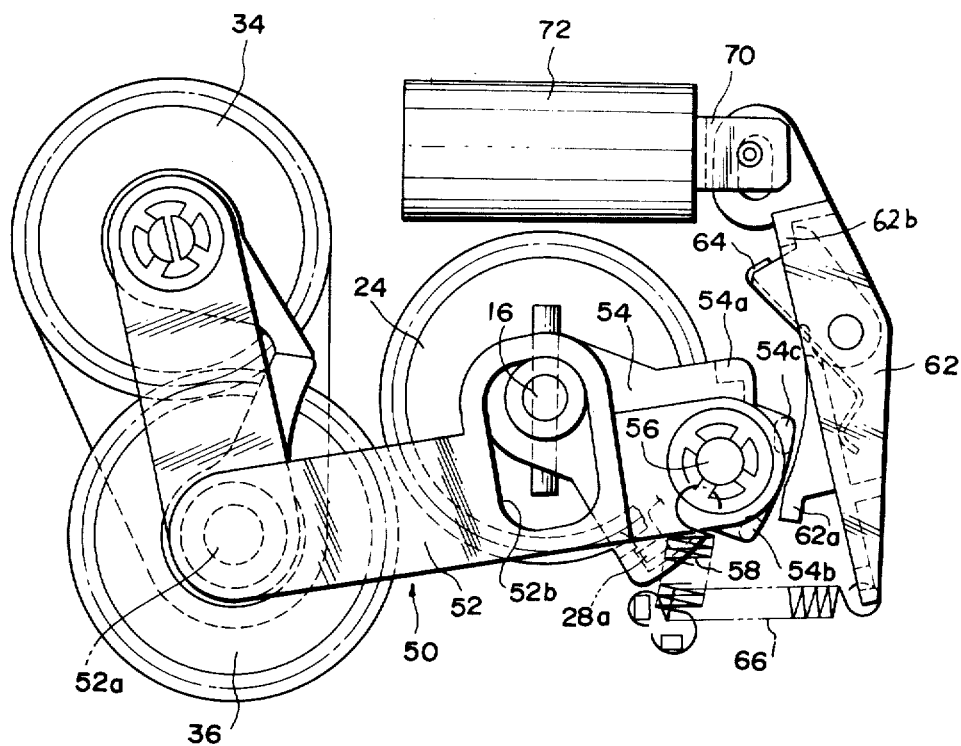
Figure 4:
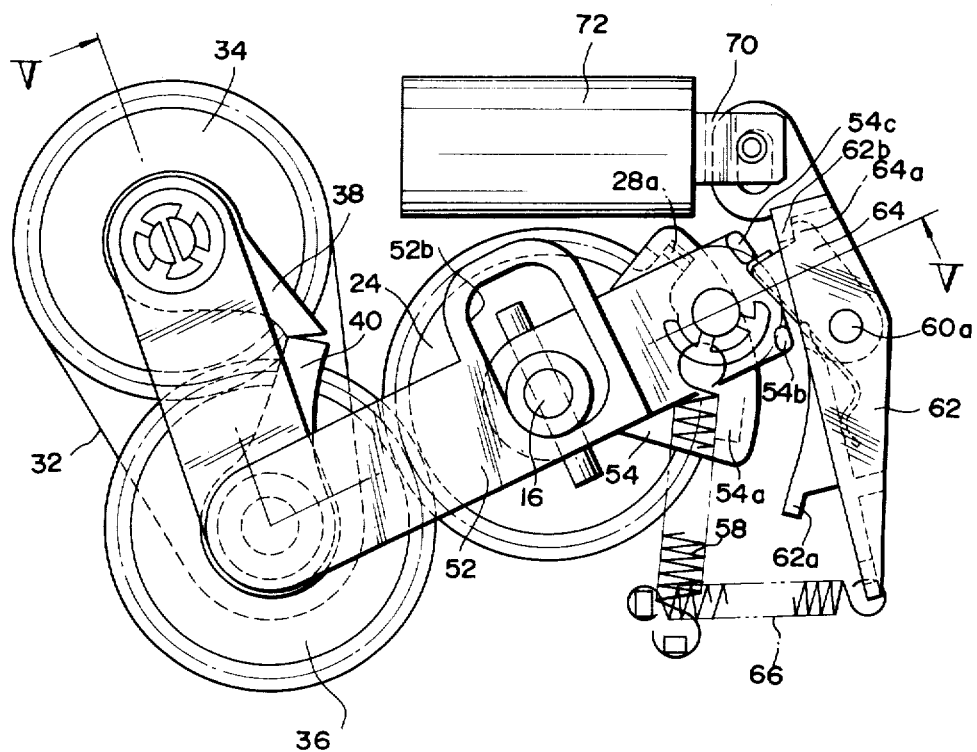

Referring now to FIGS. 2 to 4, the basic operation of the belt retractor is shown. Beginning at FIG. 2, the idle gear 36 is shown out of engagement with the main gear 24. When the user pulls the seat belt out of the belt retractor, the reel shaft 16 rotates in the counter-clockwise direction, causing counter-clockwise rotation of the disc plate 28 along with the main gear 24 to bring the projection 28a into engagement with the upper end of the link arm recess 54a, so that the projection 28a urges the link arm 54 in the counter-clockwise direction until the first projection 54b comes into engagement with the trigger member hook portion 62a to prevent further counter-clockwise rotation of the disc plate 28. After the first projection 54b comes into engagement with the hook portion 62a, the reel shaft 16 is still able to rotate in the counter-clockwise direction under a frictional force between the disc plate 28 and the main gear 24. The engagement between the link arm first projection 54b and the trigger member hook portion 62a is released when the user stops pulling the seat belt, thereby permitting clockwise rotation of the link arm 54 under the spring force of the coil spring 58.

When the user inserts the tongue into the buckle after pulling the seat belt a proper length out of the belt retractor, the buckle switch is actuated to energize the solenoid 72, causing leftward movement of the plunger 70 to rotate the trigger member 62 in the counter-clockwise direction as shown in FIG. 3. If the user inserts the tongue into the buckle while continuously pulling the seat belt out of the belt retractor, the trigger member 62 cannot rotate further in the counter-clockwise direction while the solenoid 72 is energized to attract the plunger 70. This is because the frictional force caused between the main gear 24 and the disc plate 28 by the belt pulling force overcomes the force of the coil spring 58 and holds the link arm first projection 54b in engagement with the trigger member hook portion 62a. In such case, the belt retracting spring retracts the excessive length of the seat belt to provide a close fit around the user. This causes clockwise rotation of the disc plate 28 together with the main gear 24 and permits clockwise rotation of the link lever 52 and the link arm 54 under the force of the return spring 58 so that the first projection 54b comes out of engagement with the trigger member hook portion 62a. As a result, the trigger member 62 is permitted to rotate in the counter-clockwise direction, and the components come to rest in the position shown in FIG. 3.

When from the condition of FIG. 3, the user inclines his upper body forwardly or pulls the seat belt by hand, the reel shaft 16 rotates in the counter-clockwise, causing counter-clockwise rotation of the disc plate 28 along with the main gear 24. After the disc plate projection 28a moves the predetermined length along the link arm groove 54a, it comes into engagement with the upper edge of the groove. Since the trigger member 62 is held in the position shown in FIG. 3, the disc plate 28 rotates in the counter-clockwise direction with its projection 28a urging the link arm 54 in the counter-clockwise direction therewith. The link arm second projection 54c moves along the cam surface of the hook plate 64 to urge the hook plate in the clockwise direction. When the second projection 54c rides over the hook plate 64, the hook plate returns to its initial position to prevent clockwise rotation of the link arm 54, holding the toggle joint 50 in its second position. In the second position, the reel shaft 16 comes into engagement with the opposite edge of the link lever elongate hole 52b to align itself with a line connecting the axes of the pivots 52a and 56. This provides a maximum moment on the link lever 52 to bring the idle gear 36 into mesh engagement with the main gear 24 as shown in FIG. 4. The length of the seat belt pulled out of the belt retractor during rotation of the reel shaft 16 from its FIG. 3 position to its FIG. 4 position is suitably determined to provide the proper slack on the seat belt worn around the user.

It is shown in FIG. 4 that the first and second cam members 38 and 40 are in engagement with each other in the first position to prevent counter-clockwise rotation of the idle gear 36 but permit clockwise rotation of the idle gear until they come into engagement with each other in the second position. As a result, the main gear 24 held in mesh engagement with the idle gear 36 cannot rotate in the clockwise direction. This prevents the reel shaft 16 from rotating in the direction of the seat belt being retracted even under the force of the belt retracting spring. However, the reel shaft 16 can rotate in the direction of the seat belt being pulled out of the belt retractor until the first and second cam members 38 and 40 come into engagement with each other in the second position. The length of the seat belt permitted to be pulled out of the belt retractor can be suitably determined by the choice of the ratio of the tooth number among the gears 24, 34 and 36. In this manner, the seat belt maintains a snug fit around the user with an optimum amount of slack, but also is free to be pulled out or retracted as desired.

When the user removes the tongue from the buckle, the buckle switch turns off to de-energize the solenoid 72, permitting the trigger member 62 to return to its initial position under the force of the return spring 66. This causes the toggle joint 50 to take the idle gear 36 out of engagement with the main gear 24 to permit the belt retracting spring to retract the full length of the seat belt into the retractor.

Figure 6:
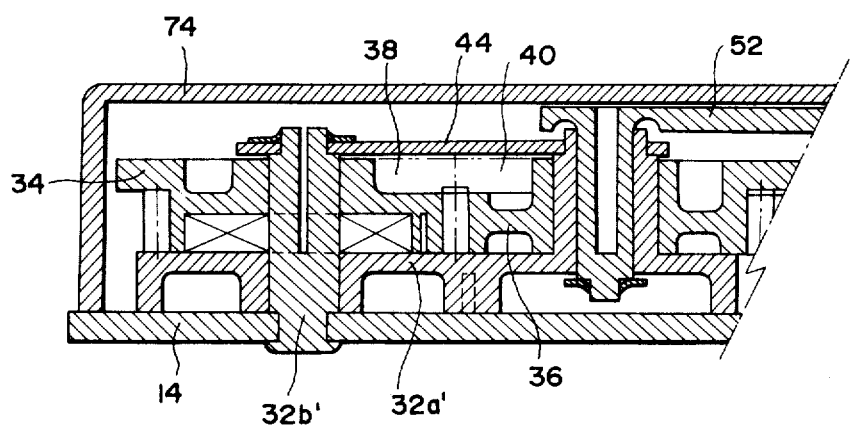
FIG. 6 is a fragmentary sectional view showing a modified form of the belt retractor of this invention.

FIG. 6 illustrate a modified form of the present invention which is substantially similar to the embodiment of FIG. 1, except that the pivot shaft 32b' is rotatably supported only by one side plate 14 and does not extend to the other side plate 14. As shown in FIG. 6, the pivot shaft 32b' and the base plate 32a' may be produced separately. This arrangement obviates the limitation on the length of the seat belt wound around the belt reel, in that the pivot shaft 32b is not present to limit the size of the winding on the reel.

While the present invention has been described in conjunction with a specific embodiment thereof, it is evident that many alternatives, modifications and variations will be apparent to those skilled in the art. Accordingly, it is intended to embrace all alternatives, modifications and variations that fall within the spirit and broad scope of the appended claims.

What is claimed is:

1. A belt retractor including a frame structure, a reel shaft having thereon a belt reel with a coil of seat belt wound therearound, said reel shaft secured to said frame structure for rotation in a first direction when said seat belt is pulled out of said belt reel and spring-biased for rotation in a second direction to retract said seat belt around said belt reel, said belt retractor comprising:
    (a) lock means movable into driving connection with said reel shaft to prevent rotation of said reel shaft in the second direction while permitting said reel shaft to rotate through a predetermined angle in the first direction and to rotate back through said predetermined angle in the second direction; and
    (b) drive means for bringing said lock means into driving connection with said reel shaft when said seat belt is worn, said drive means including link means spring-biased toward a first position where it removes said lock means from driving connection with said reel shaft, said link means being movable with rotation of said reel shaft in the second direction toward a second position where it brings said lock means into driving connection with said reel shaft, control means spring-biased toward a first position where it restricts the movement of said link means toward its second position, said control means being movable to a second position where it permits said link means to move to its second position and holds said link means in the second position, and actuator means for providing a force to bring said control means to its second position when said seat belt is worn.

2. A belt retractor according to claim 1, wherein said lock means comprises a main gear secured on said reel shaft, an idle gear for mesh engagement with said main gear, a stop gear held in mesh engagement with said idle gear, a pair of cam members secured to said idle and stop gears, respectively, and spring means for urging one of said idle and stop gears to hold said cam members in engagement at a position to prevent said idle gear from rotating in a first direction but permit said idle gear to rotate in a second direction opposite the first direction against the force of said spring means until said cam members come into engagement at another position where said idle gear cannot rotate in the second direction but can rotate in the first direction.

3. A belt retractor according to claim 2, wherein said link means comprises a link lever having one end pivoted to said idle gear and formed at an intermediate section with an elongate hole for receiving said reel shaft, a link arm having one end pivoted to said reel shaft and the other end pivoted to the other end of said link lever, a disc member urged against said main gear for rotation with said main gear under a frictional force therebetween, and wherein said disc member has a projection extending toward said link arm for engagement with said link arm.

4. A belt retractor according to claim 3, wherein said link arm is formed with a groove for movement of said projection of said disc member therein, said groove having a predetermined length to provide a proper slack on said belt seat when said seat belt is worn.

5. A belt retractor according to claim 3, wherein said link arm has a cam portion for engagement with said control means.

6. A belt retractor according to claim 5, wherein said control means includes a lever member pivoted on said frame structure, a first hook for engagement with said cam portion of said link arm at said first position of said control means, and a second hook for engagement with said cam portion at said second position of said control means.

7. A belt retractor according to claim 6, wherein said actuator means includes a plunger connected to said lever member of said control means, and a solenoid being energized when said seat belt is being worn, to move said plunger, thereby causing rotation of said lever member of said control means from its first position to its second position.

* * * * *